United States Patent
Gabrys et al.

(10) Patent No.: US 7,066,050 B1
(45) Date of Patent: *Jun. 27, 2006

(54) LIFE COUNTER FOR FLYWHEEL ENERGY STORAGE SYSTEMS

(76) Inventors: Christopher W Gabrys, 900 S. Meadows Pkwy. #3513, Reno, NV (US) 69511; David R. Campbell, 6850 Sharlands Ave. #W1137, Reno, NV (US) 89523

( * ) Notice: Subject to any disclaimer, the term of this patent is extended or adjusted under 35 U.S.C. 154(b) by 124 days.

This patent is subject to a terminal disclaimer.

(21) Appl. No.: 10/329,105

(22) Filed: Dec. 23, 2002

Related U.S. Application Data

(60) Provisional application No. 60/342,423, filed on Dec. 21, 2001.

(51) Int. Cl.
*H02K 7/02* (2006.01)

(52) U.S. Cl. ............ 74/572.1; 74/574.1; 310/74; 310/90.5; 417/51; 701/115; 702/35; 73/862.31

(58) Field of Classification Search ............ 310/74, 310/90.5; 417/51; 701/115; 702/35; 73/862.31; 74/572, 573 R, 574
See application file for complete search history.

(56) References Cited

U.S. PATENT DOCUMENTS

| | | | |
|---|---|---|---|
| 5,065,060 A * | 11/1991 | Takahashi et al. | 310/74 |
| 5,124,605 A | 6/1992 | Bitterly et al. | 310/74 |
| 5,614,777 A | 3/1997 | Bitterly et al. | 310/74 |
| 5,705,902 A | 1/1998 | Merritt et al. | 318/254 |
| 5,912,519 A | 6/1999 | Horner et al. | 310/74 |
| 5,932,935 A | 8/1999 | Clifton et al. | 307/60 |
| 5,969,446 A * | 10/1999 | Eisenhaure et al. | 310/74 |
| 5,998,899 A * | 12/1999 | Rosen et al. | 310/90.5 |
| 6,098,022 A * | 8/2000 | Sonnichsen et al. | 702/35 |
| 6,115,666 A * | 9/2000 | Ng | 701/115 |
| 6,262,505 B1 | 7/2001 | Hockney et al. | 310/90.5 |
| 6,585,490 B1 * | 7/2003 | Gabrys et al. | 417/51 |
| 6,664,680 B1 * | 12/2003 | Gabrys | 310/74 |

FOREIGN PATENT DOCUMENTS

JP          58-166233    * 10/1983    ............ 73/862.31

* cited by examiner

*Primary Examiner*—Vinh T. Luong
(74) *Attorney, Agent, or Firm*—J. Michael Neary

(57) ABSTRACT

A life counter that calculates and records the life utilized of the flywheel in a flywheel energy storage system and indicates when it should be removed from service, based on operational history instead of monitoring for symptoms of failure. The life counter can effectively monitor and measure any or all of the flywheel energy storage system parameters, such as the flywheel structural life, vacuum system life, bearing system life and electronics life. The life counter ensures safe operation of highly stressed flywheels by indicating when the safety margin for the flywheel is reached so that the flywheel energy storage system can be removal from service prior to encountering a risk of catastrophic failure. In some cases, failures may not be preceded by measurable warning symptoms, so removal from service at a calculated end of life would be desirable. The life counter can indicate that the flywheel system should be removed from service by several methods that include triggering an alarm, displaying a reading, altering operation or stopping operation. The life can be indicative of the flywheel structural life, as adjusted by a suitable safety factor, or electronics high power cycle life.

18 Claims, 9 Drawing Sheets

Parameters and Components Affecting Flywheel System Life

| Parameter | Potential Components |
|---|---|
| Flywheel Structural Life | Steel flywheel fatigue/fracture<br>Composite flywheel fatigue<br>Composite flywheel stress rupture |
| Vacuum System Life | Getter material capacity<br>Getter heater fatigue<br>Vacuum pump wear |
| Bearing System Life | Ball bearing fatigue<br>Ball bearing lubricant<br>Magnetic bearing controller switching |
| Electronics Life | Input power conversion switching<br>Output power conversion switching<br>System controller operation |

Fig. 3

LIFE COUNTER FOR FLYWHEEL ENERGY STORAGE SYSTEMS

This is related to U.S. Provisional Application No. 60/342,423 filed on Dec. 21, 2001, and entitled "Life Cycle Counter for Energy Storage Flywheels".

This invention pertains to a life counter for flywheel energy storage systems, and more particularly to a life counter that calculates and records the life utilized of the flywheel energy storage system and indicates when it should be removed from service. Unlike a simple health measurement monitoring system, the life counter calculates and records life utilized based on the operational history, allowing for increased safety and reliability and higher performance operation. The life counter can be utilized for parameters including flywheel structural life, vacuum system life, bearing system life and electronics life. The invention is particularly useful for ensuring safe operation by indicating the structural life utilized of highly stressed flywheels. The life counter indicates when the safety margin for the flywheel or other components is reached so that the flywheel energy storage system can be removal from service prior to encountering a risk of catastrophic failure.

BACKGROUND OF THE INVENTION

Electrical power supplied by the utility grid is not sufficiently reliable for an increasing number of applications. Power interruptions and voltage sags often cause substantial problems in electrical and electromechanical devices that limit the effectiveness and reliability of these devices. R. T. Morash and R. J. Barber of Precise Power Corporation published prior to 1997 a study entitled "How to Improve Your Customers' Power Quality." In this study, they delineated three bell-shaped, that is, normally distributed, curves that describe the quality of power that can be expected from the grid. They found that 90% of power interruptions have durations of between 0.1 seconds and 10 seconds, 5% of power interruptions have mean durations of approximately 10 seconds and 5% of power interruptions have mean durations of approximately 3 hours. In a separate study, H. Reiss in 1992 in an ABB Technical Report found at one U.S. facility that of the 443 power disturbances that occurred in one year: 264 were sags (voltage amplitude falls below nominal for one or more cycles) and 15 were interruptions (complete loss of voltage—can be momentary, a few power cycles, or prolonged.) In total, the grid is 99.9% reliable, indicating that the loss of power will occur at an average location for 8 hours per year.

If a power conditioning device, in particular, a flywheel uninterruptible power device is used, inertial energy will be periodically extracted from the flywheel and converted to electrical energy in order temporarily to supplement or make up for power normally derived from the grid. This extracted power will cause the rotational velocity and thereby the stress level in the flywheel to cycle from a maximum value to a lower value. Once the power disturbance has passed, some power from the grid is used to accelerated the flywheel back to its maximum operational rotational velocity, thus completing the discharge/charge cycle. Since the stress level in the flywheel will vary according to the duration of the power disturbance and since the aforementioned studies indicate that the duration of power interruptions vary over a wide range, the longevity of a flywheel uninterruptible power supply cannot be assumed or simply determined. The longevity of the flywheel, in fact, will be a complex function of the history of the power disturbances.

Flywheel energy storage systems are also utilized for other applications besides uninterruptible power supplies. Such applications include bulk energy storage, energy storage from alternative energy generation, load leveling, hybrid electric vehicle acceleration and regeneration energy storage, and for pulse power applications. No matter the use, ensuring the safety and reliability of flywheel energy storage systems are of critical importance.

SUMMARY OF THE INVENTION

The invention provides a life counter for flywheel energy storage systems that calculates and records the life utilized of the flywheel system and indicates when it should be removed from service. The life counter differs from previous health measurement monitoring systems for electro-mechanical devices because the life counter calculates and records life utilized based on operational history instead of monitoring for symptoms of failure. The life counter increases safety and reliability, and allows for potentially higher performance operation and lower costs. The life counter can effectively monitor and measure any or all of the flywheel energy storage system parameters, such as the flywheel structural life, vacuum system life, bearing system life and electronics life. The flywheel structural life is a function of the number of stress cycles, variation of stress and in some cases the duration at high stress. The vacuum system life can be controlled by the getter capacity, getter heater fatigue or vacuum pump wear. The bearing system life is affected by ball bearing fatigue, lubrication or magnetic bearing electronics switching cycles. Likewise, the electronics life may be a function of the switching cycles or high power operation durability. Although useful for all systems, the life counter is of particular value for the flywheel structural life. The life counter ensures safe operation of highly stressed flywheels by indicating when the safety margin for the flywheel is reached so that the flywheel energy storage system can be removal from service prior to encountering a risk of catastrophic failure. In some cases, failures may not be preceded by measurable warning symptoms, so removal from service at a calculated end of life would provide substantial benefit.

The life counter can indicate that the flywheel system should be removed from service by several methods that include triggering an alarm, displaying a reading, altering operation or stopping operation. In its simplest form, the life counter merely calculates or counts the discharge cycles and displays the count wherein the flywheel system is removed from service after reaching a certain count corresponding to the predicted life of the flywheel system. The life can be indicative of the flywheel structural life, as adjusted by a suitable safety factor, or electronics high power cycle life. Alternatively, another configuration life counter is a timer that records the time in operation wherein the flywheel system is then removed from service when a certain number of hours in operation has been achieved. In this case, the life may be indicative of the stress rupture life of the flywheel at high speed, ball bearing fatigue, lubrication life, electronics switching life or the capacity of the vacuum system to continue to maintain the vacuum surrounding the flywheel. All of these approaches may be combined in a single life counter to account for all possible failure modes.

The structural life of the flywheel is of critical importance to the safety of a flywheel energy storage system. Flywheels operate at high stress levels in operation and are subject to failure after continued cycling between the normal, fully charged operating speed and a lower speed when the flywheel system is discharged to some degree. Although a life counter can be utilized that simply counts the charge-discharge cycles of the flywheel system, not all discharges utilize an equal amount of the life of the flywheel. For instance, when a flywheel energy storage system is used as an uninterruptible power supply, the flywheel protects against power interruptions having various durations. The longer the duration, the greater the depth of discharge of the flywheel (slower speed) and hence the greater is the variation in stress from normal full speed operation. The higher the variation in stress, the more fatiguing the discharge cycle is and the more flywheel life is utilized. Deep discharges can subtract significant life while shallow discharges have little effect. Simply counting the discharge cycles and treating them all the same can allow for the flywheel to either have an unexpected failure or to alternatively be prematurely removed from service.

In one embodiment of the invention, the life counter calculates and records the flywheel structural life utilized by the depth of discharges, for increased accuracy. The stress in a flywheel is a function of its speed so a ratio R between minimum stress and maximum stress for a given discharge cycle can be determined by a measure of the speed to which a flywheel is discharged before being recharged. The ratio R for a given cycle is then simply the stress level at the minimum speed divided by the stress at normal operating speed. For every discharge cycle an R value is then fed into a counter microprocessor or computing device that incrementally deducts the reduction in life from that cycle. The counter can employ one several mathematical calculations methods to deduct the life. The flywheel life can be based on the fatigue life of the flywheel material. Alternatively, a more accurate flywheel life can be based on the fracture crack growth properties and an initial maximum flaw size. One method is to employ fracture mechanics in which the crack growth is advanced toward a critical crack flaw size. The initial flaw limit is preferably certified by nondestructive evaluation prior to service. This is particularly useful for steel flywheels, which have the lowest costs, and can thereby be safely operated to high speeds. For composite material flywheels, the composite materials can also experience failure from stress rupture, which is time under load even without cycling. For these types of flywheels, the life counter preferably includes an operational timer that indicates when the flywheel should be removed from service based on the amount of time at high speed. Combinational life counters employing both cycles and time under load history could also be utilized.

Compared with health measurement systems that use sensors to monitor for symptoms of failure of a flywheel system, the invention provides a reliable process and apparatus for determining when the flywheel system should be safely removed from service prior to a failure. This is particularly important because some failure modes may not have detectable symptoms or warning signs prior to complete failure. Use of the life counter requires a good understanding and analysis of the flywheel system components and their operating lives. However, the invention can provide increased safety and reliability and allow for higher performance operation. It can also reduce the flywheel system costs and complexity by reducing or eliminating the number of health measurement sensors and monitoring systems. Such sensors include thermocouples, vibrational sensors, vacuum gauges and load cells.

DESCRIPTION OF THE DRAWINGS

The invention and its many features and advantages will become better understood upon reading the detailed description of the preferred embodiments in conjunction with the following drawings, wherein:

FIG. 3 is a table of parameters and components affecting flywheel system life.

DESCRIPTION OF THE PREFERRED EMBODIMENT

Figure 1:
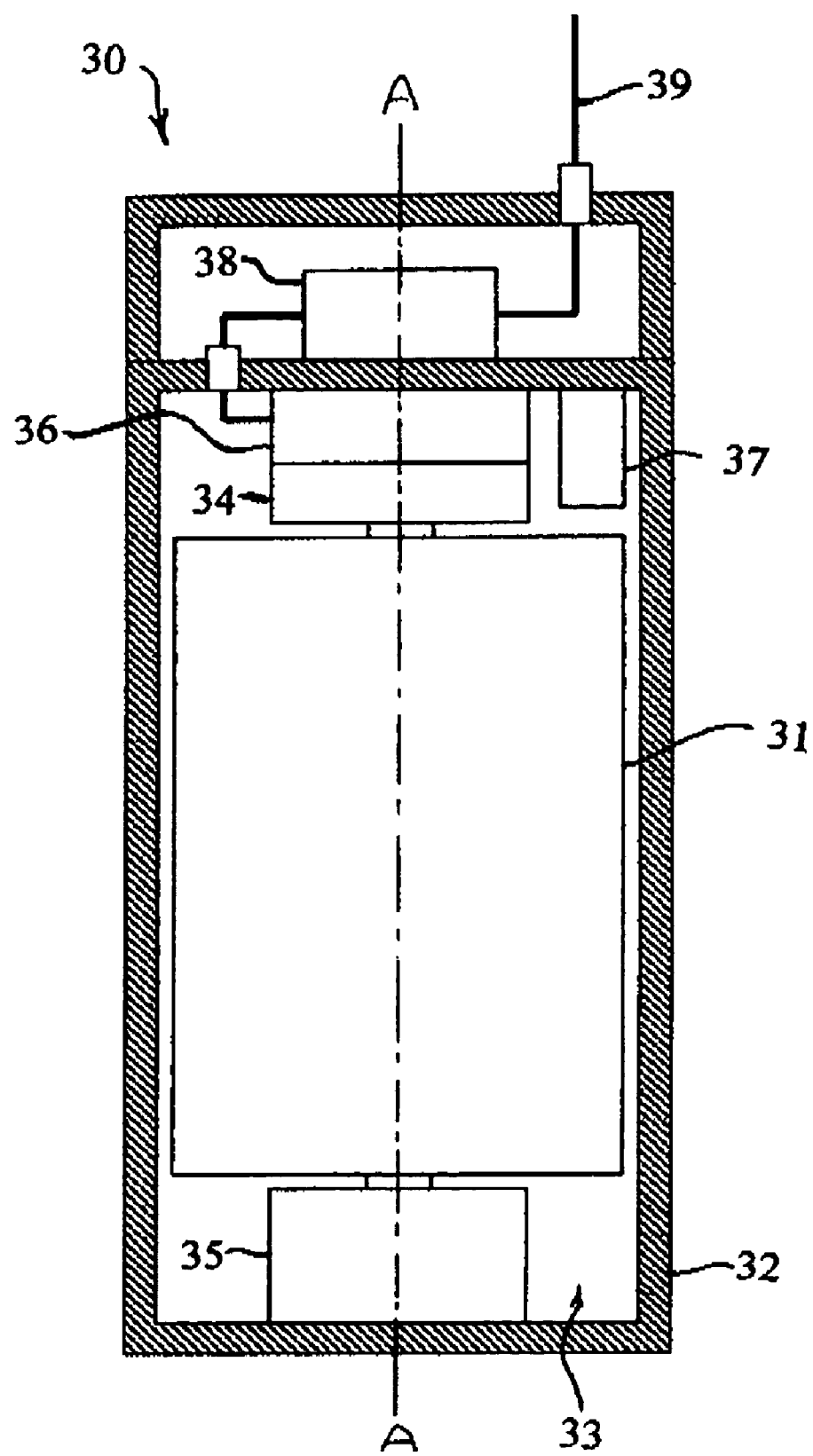
FIG. 1 is a schematic drawing of a flywheel energy storage system.

Turning now to the drawings, wherein like reference numerals designate identical or corresponding parts, and more particularly to FIG. 1 thereof, a flywheel energy storage system 30 is shown having a flywheel 31, constructed from metals such as high strength steel or alternatively from composite materials, that stores energy kinetically in rotational inertia and is supported for rotation about a vertical axis in a chamber 33 in a sealed container 32 that is evacuated for reduction of aerodynamic drag. The flywheel 31 is supported for rotation by a bearing system comprised of upper and lower bearings 34 and 35, which can be mechanical, such as ball bearings, magnetic or a combination. The bearings 34, 35 preferably support the flywheel 31 for a long reliable operating life with low losses. A motor/generator 36 is attached or made integral with the flywheel 31 for accelerating and decelerating the flywheel 31 for storing and retrieving energy. The power to and from the motor/generator 36 is regulated and/or converted using electronics 38. The electronics 38 connect the motor/generator to an outside power connection 39. The flywheel energy storage system 30 can be utilized for numerous applications, such as uninterruptible power supplies for short or long term power delivery, bulk energy storage, hybrid vehicle energy storage, and pulse power applications.

Figure 2:
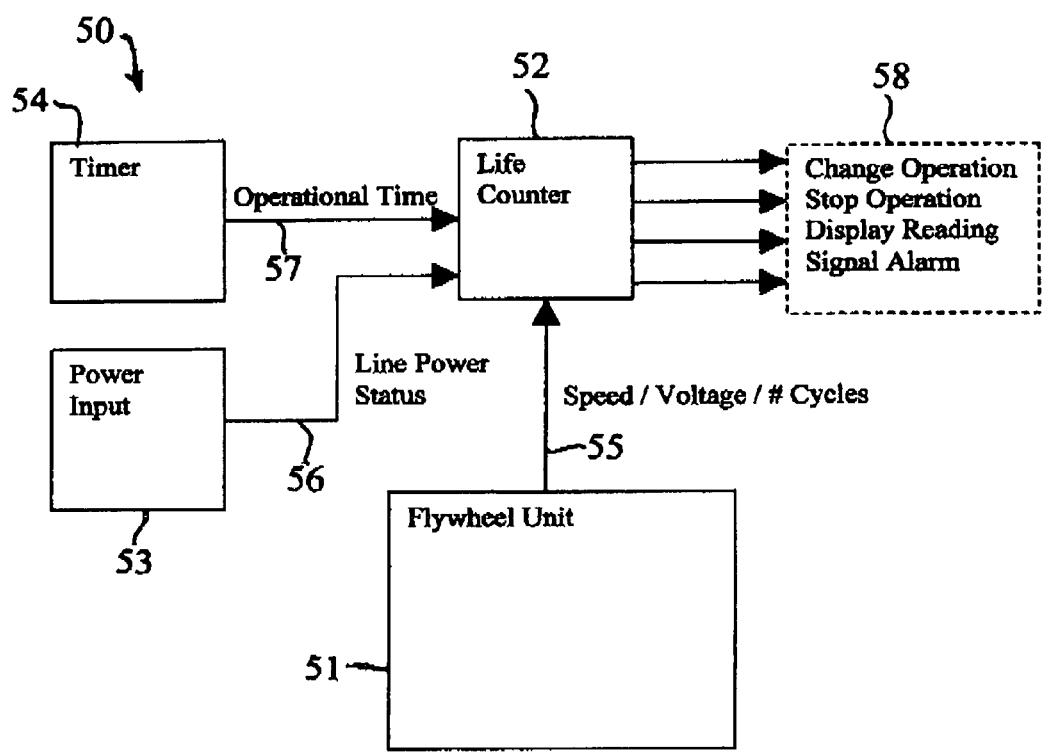
FIG. 2 is a schematic drawing of a flywheel energy storage system and life counter in accordance with the invention.

A flywheel energy storage system 50 with life counter, shown in FIG. 2, includes a flywheel unit 51 and a life counter 52 that calculates and records the life utilized and indicates when the flywheel system 50 should be taken out of service. Unlike a health measurement monitoring system that would use sensors to try to detect for the symptoms of failure, the life counter 52 calculates and records the life utilized based on the operational history. The flywheel system 50 therefore can preferably be removed from service prior to failure for increased safety and reliability. The life counter 52 can also allow for higher performance operation and potentially reduced costs by eliminating sensors and monitoring systems. The life counter 52 can be configured in the system to receive signals from the flywheel unit 51, a timer 54, and the power input 53. The flywheel unit 51 can provide signals 55 to the life counter 52 about flywheel speed, voltage and number of cycles. The timer 54 can provide a signal 57 to the life counter 52 about the time in operation. Likewise, the input power can provide a signal 56 to the life counter 52 about the power line status. The life counter 52 calculates the life utilized, based on predetermined factors that influence that life as affected by the operational conditions of the system element input 55, 56, 57 and any other relevant inputs, and then indicates when the flywheel system 50 should be removed from service by generating one or more signals 59 to an alarm, indicator or actuator 58 which can effect a change of operation, stopping the operation, displaying a reading, signaling an alarm, or other suitable response. In its most simple form, the indication provides a count of the discharge cycles or the time in operation. A service person can remove the flywheel system when a certain value has been reached, indicated the end or near end of life for the system or one of its components. More integrated life counters can trigger alarms, stop operation or alter operation such as no longer fully charge. More sophisticated life counters can also utilize a microprocessor or computing device that calculates a relative life utilized percentage based on depth of cycles and other parameters.

Some key parameters and components affecting flywheel system life are shown in the table of FIG. 3. Parameters that affect the life of the entire flywheel system life include the flywheel structural life, vacuum system life, bearing system life and electronics life. The flywheel structural life is a function of factors which include the fatigue or fracture of the flywheel material, whether steel or composites. For composite material flywheels, the flywheel structural life is also a function of the stress rupture or time under load at high speed. The vacuum system can be constructed using a getter or alternatively a mechanical vacuum pump. For getter pumps, the vacuum system life is a function of the getter capacity for the system outgassing and also the getter heater fatigue. For mechanically pumped vacuums, the vacuum system life is a function of the vacuum pump wear. The bearing system life is controlled by the ball bearing fatigue and lubricant for mechanical bearings and by the controller switching for magnetic bearings. The electronics life is a function of the input power conversion switching, the output power conversion switching and the system controller operation. Other factors influencing component life of particular flywheel system may also exist and can be accounted for in the life counter.

One of the most critical components of flywheel system safety is the flywheel structural life. A sequence of stress variations will cause a flywheel, irrespective of its metallic alloy or composite composition, to fatigue and eventually, if operated well beyond its useful life, to fracture. Accordingly, we believe that prudent operation of a flywheel energy storage system using a flywheel would include a conservative estimate of the useful life of the flywheel, and a process for indicating when a safety margin to that useful life is reached, so the system can be safely retired and replaced. Although energy storage flywheels can be constructed from steel or composite materials, steel flywheels allow for the most economical flywheel systems. The life counter can be utilized for calculating and recording the life utilized for steel or composite flywheels. Several life counting mechanisms for steel flywheels are described below as examples contemplated for this invention.

Figure 4:
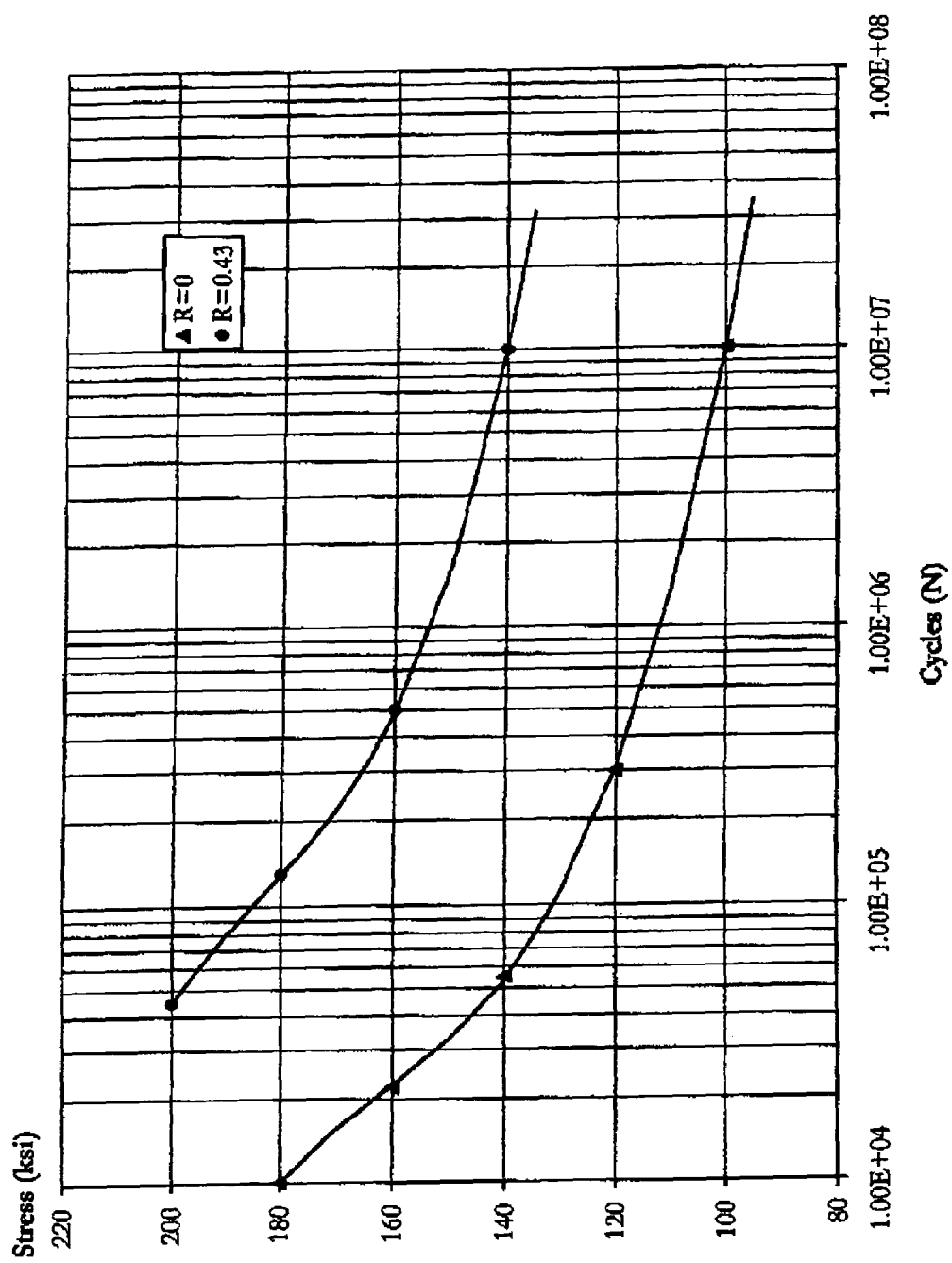
FIG. 4 is a plot of stress vs. cycles showing the fatigue life of 4340 steel with 200 ksi ultimate strength.

Fatigue data for different materials under various loading conditions are widely available in the literature. As an example, stress-life fatigue data of 4340 steel possessing a 200 ksi ultimate strength at two different stress levels is presented in FIG. 4. Though stress-life data is presented, strain-life data could be equally used. The variable R in this case is the ratio of the minimum applied stress to the maximum applied stress. If a part is to be designed to last 100,000 cycles and the minimum applied stress is zero, that is, R=0, the maximum operating stress for the part is limited to 130 ksi. Alternatively, if a part is expected to have a maximum operating stress of 120 ksi and a minimum operating stress of 0 ksi, then a part can be safely operated for 300,000 cycles.

However, if the maximum operating stress is not always the same value, or if the minimum operating stress at each cycle is different, such as is the case with an energy storage flywheel system, the fatigue life calculation is more complicated. One approach is to use a conventional linear damage technique to determine the longevity of flywheel under such conditions. One linear damage technique was developed by A. Palmgren, which was presented in the 1924 study entitled "Durability of Ball Bearings"—and M. A. Miner—presented in the 1945 study entitled "Cumulative Damage in Fatigue." Unfortunately, such fatigue analysis techniques may not suffice. If large stress/strain cycles precede small stress/strain cycles a part may fail prematurely, that is, the actual life of a part may be far shorter than the life that was predicted using conventional fatigue analysis. Likewise, if small stress/strain cycles precede large stress/strain cycles, a part may be withdrawn from service based on fatigue analysis long before its useful life has ended. This phenomenon is due in part to different mechanisms, i.e., crack nucleation and crack propagation, involved in fatigue crack initiation and growth. To account for these different mechanisms and to avoid the aforementioned problems two alternative fatigue techniques can be used.

Figure 5:
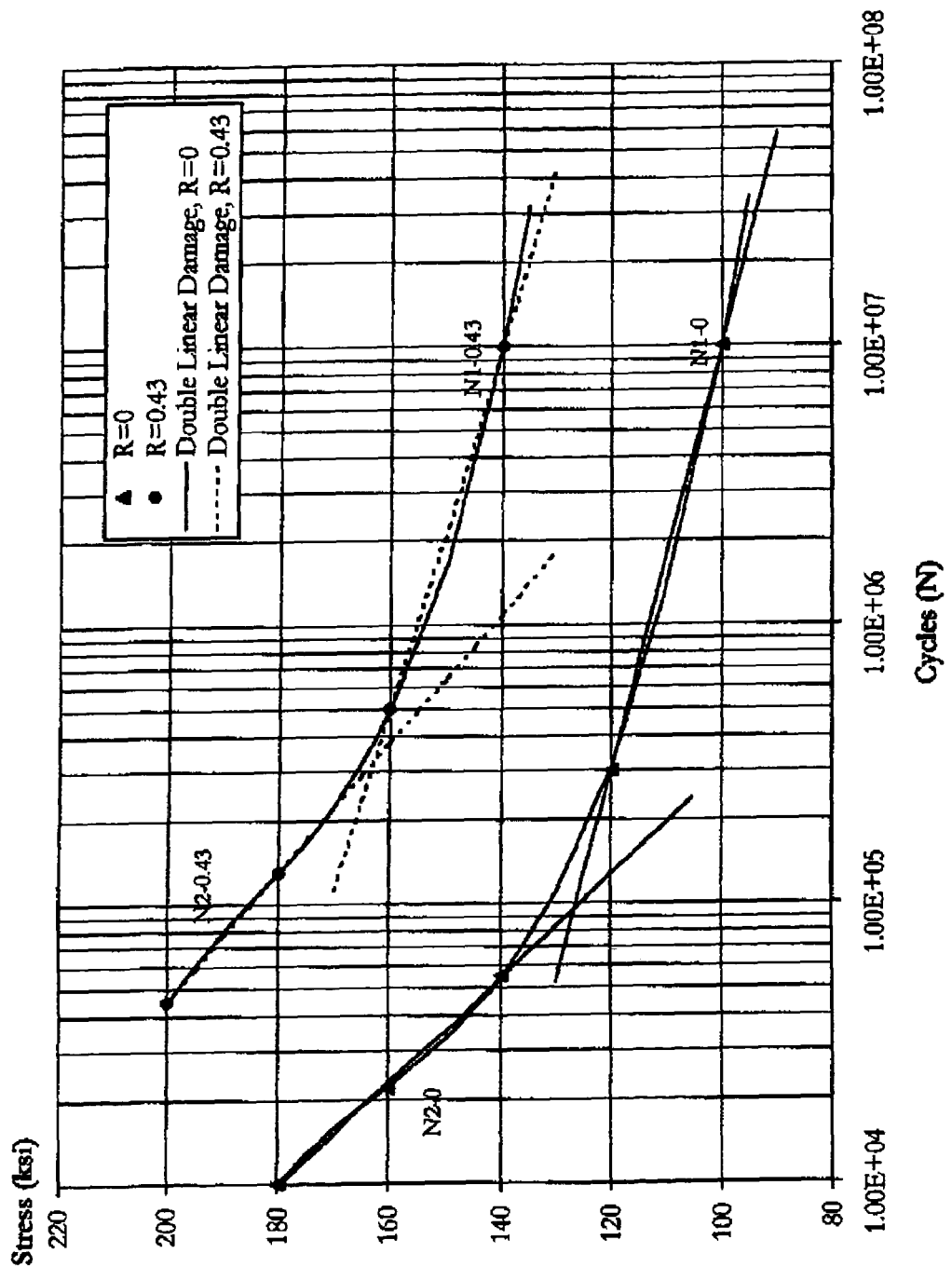
FIG. 5 is a chart illustrating a double linear damage fatigue life cycle counting algorithm.

The first technique uses a double-linear damage rule as is illustrated in FIG. 5. This approach splits typical nonlinear fatigue data curves into a linearized crack nucleation regime—as represented by the straight lines on a semi-log plot, N1-0 and N1-0.43—and a linearized crack propagation regime—as represented by the straight lines on a semi-log plot, N2-0 and N2-0.43. A similar approach can be utilized if more than two fatigue life curves are required to represent the load history of a part.

Equations for the crack nucleation curves can be found to be:

$$N1(R=0)=\mathrm{Exp}(-0.1753\sigma+33.6509)$$

$$N1(R=0.43)=\mathrm{Exp}(-0.1498\sigma+37.0882)$$

where Exp is the exponential function and σ is the stress.

Equations for the crack propagation curves can be found to be:

$$N2(R=0)=\mathrm{Exp}(-0.0426\sigma+16.8604)$$

$$N2(R=0.43)=\mathrm{Exp}(-0.043\sigma+21.3231)$$

For the case when the stress is 130 ksi, N1 (R=0)=5.22E4, N1 (R=0.43) 4.46E7, N2 (R=0)=8.27E4 and N2 (R=0.43) =1.85E6. The life of a part is determined by first counting the number of cycles to cause the crack to nucleate, the nucleation life, and then to count the number of cycles to cause the crack to propagate to failure, the propagation life. If a nucleation cycle at R=0 is denoted by the letter a, a nucleation cycle at R=0.43 by the letter b, a propagation cycle at R=0 by the letter c and a propagation cycle by the letter d, the two part life cycle counting algorithm is as follows:

While Ncount less than 1

Ncount=Ncount+$a$/5.22$E$4+$b$/4.46$E$7

While Pcount less than 1

Pcount=Pcount+$c$/8.27$E$4+$d$/1.85$E$6

The life of the flywheel is exhausted when both counters reach 1.

Figure 6:
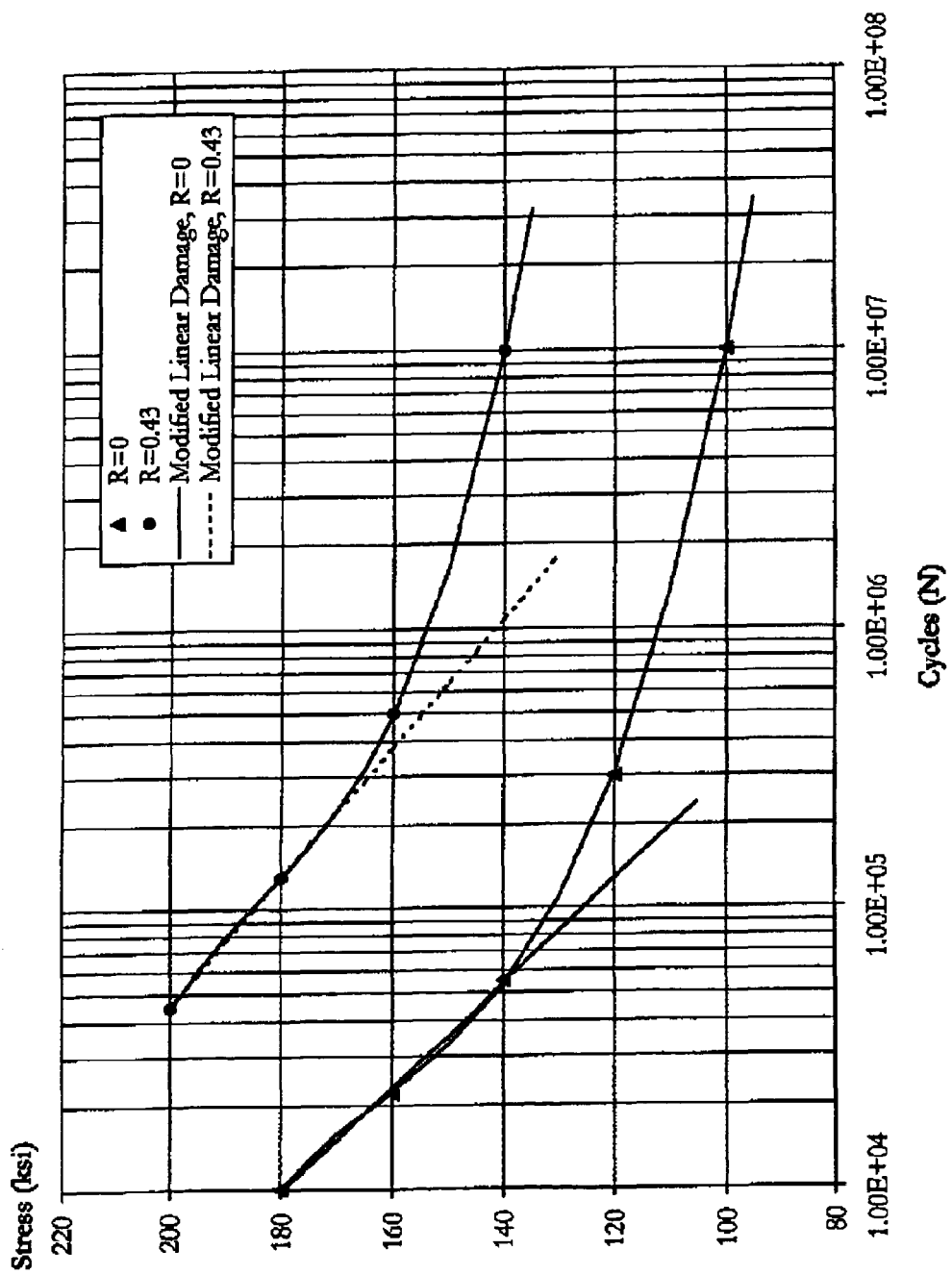
FIG. 6 is a chart illustrating a modified linear damage fatigue life cycle counting algorithm.

The second technique shown in FIG. 6 determines the life based upon only the crack propagation portion of the fatigue curve, that is, a crack is presumed to already exist within the part. The portion of the first technique that pertains to the crack nucleation phase is simply not utilized. So for the case when the stress is 130 ksi, the life algorithm is
While Pcount less than 1

Pcount=Pcount+$c$/8.27$E$4+$d$/1.85$E$6

The life of the flywheel is exhausted when the counter reaches 1.

Rather than use a fatigue life approach, a fracture mechanics approach can be utilized. In fracture mechanics, either a known or predetermined crack size is used. The rate at which a crack will grow at different stress levels can be accurately determined for known materials in a know heat-treat condition. In a life cycle counter program, one fracture technique that can be utilized involves using a set of stress amplitude ranges, or nondimensionally, a set of stress ratio ranges—typically denoted by R, directly for the computation of life. In the case of a flywheel made of 4340 alloy steel (Fty=155 ksi, K1c=135 ksi-in$^{1/2}$) with a maximum operating stress of 150 ksi, a set of stress ratio ranges could be R={0.00–0.20, 0.20–0.40, 0.40–0.60, 0.60–0.80, 0.80–0.90, 0.90–1.00}. Using the lowest value of R in each specified, the predicted fracture mechanics life of the flywheel would be {5200, 6050, 8850, 25550, 169800, 1279300} cycles. As was aforementioned, the stress ratio in different cycles of the flywheel 30 is expected to vary. To account for this variation, a linear life algorithm increments a counter, denoted Count, upon each occurrence of a predetermined stress ratio while Count is less than 1. The life of the flywheel is exhausted when the counter reaches 1.

Count=($a$/5200)+($b$/6050)+($c$/8850)+($d$/25550)+($e$/169800)+($f$/1279300) Count<1

Figure 7:
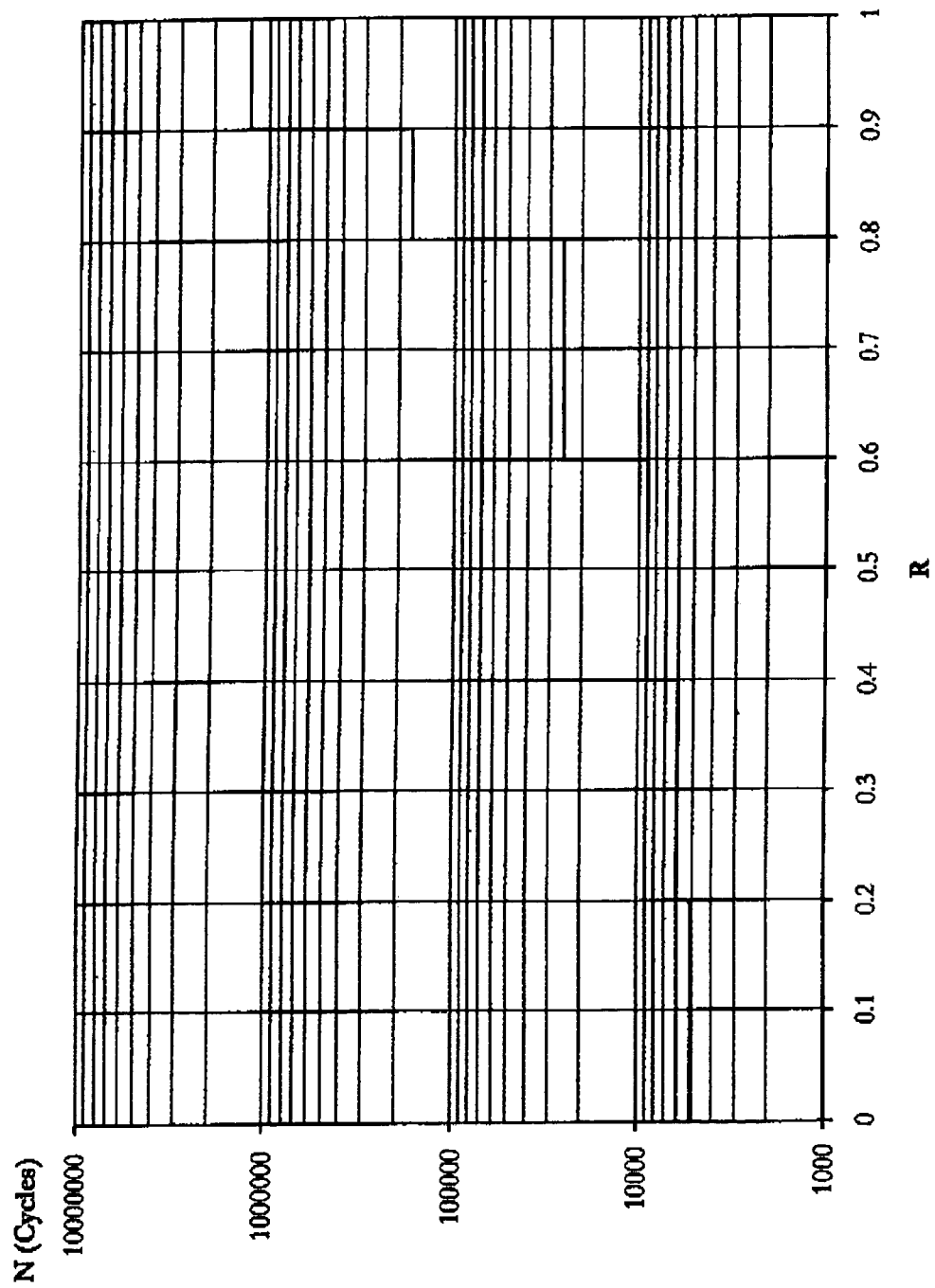
FIG. 7 is a chart illustrating a gated fracture mechanics life cycle counting algorithm.

The life function can be seen in FIG. 7.

A second fracture mechanics technique would involve using the assumption that all stress cycles would traverse from the maximum stress to the minimum stress and back to the maximum stress without any intervening local maxima or minima. This technique would allow a counting algorithm to be of the form: while the value of the counter is less than one, the counter is incremented after each cycle given only the depth of the discharge, that is, the minimum stress. In an energy storage flywheel system, the voltage, which is proportional to the stress, can be alternatively used as the metric. In other words, the count is incremented according to a predetermined function of the minimum stress, or nondimensionally as the ratio of the minimum stress versus the maximum stress. In the case of a 4340 alloy steel (Fty=155 ksi, K1c=135 ksi-in$^{1/2}$) flywheel with a maximum operating stress of 122 ksi, the counting algorithm would be:
While Counter less than 1

Figure 8:
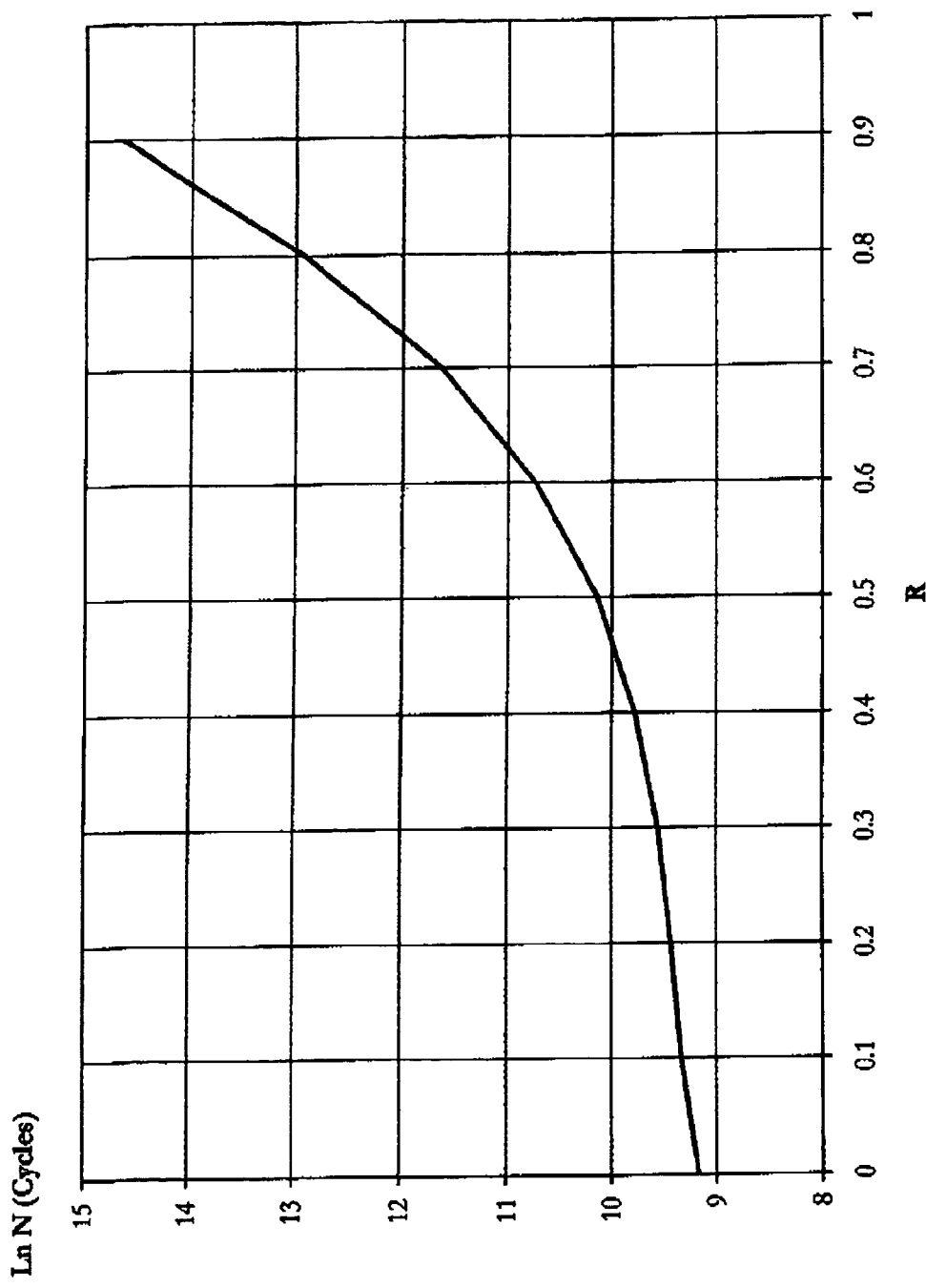
FIG. 8 is a chart illustrating an R-curve fracture mechanics life cycle counting algorithm.

Counter=Counter+1/Exp[11.736$R$^3−6.0255$R$^2+2.0025$R$−9.1728], where Exp is the exponential function and R is the ratio of the minimum stress to the maximum stress. The exponential life function can be seen in FIG. 8. Different functions can be devised for different materials and different maximum stress levels.

As a third fracture mechanics alternative, one could implement the governing equations for crack propagation, such as the NASGRO equations, directly into a life counting algorithm. The NASGRO equation is used by NASA for crack growth life prediction and is given by $$\frac{da}{dN} = C\left[\left(\frac{1-f}{1-R}\right)\Delta K\right]^n \frac{\left(1-\frac{\Delta K_{th}}{\Delta K}\right)^p}{\left(1-\frac{K_{max}}{K_{crit}}\right)^q}$$

where C, n, p and q are empirically derived and are based upon material testing, and $$f = \frac{K_{op}}{K_{max}} = \max(R, A_0 + A_1 R + A_2 R^2 + A_3 R^3).$$

Figure 9:
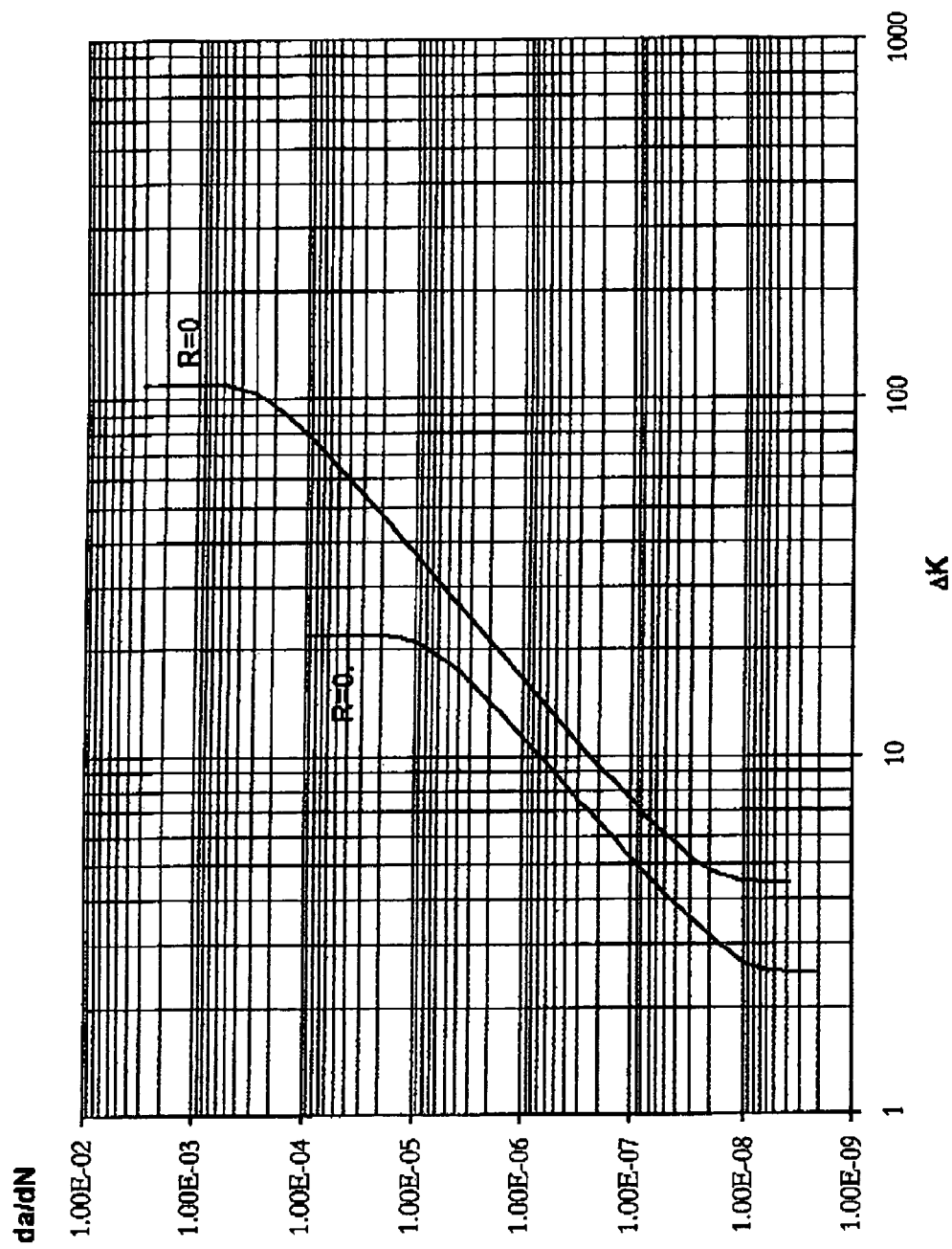
FIG. 9 is a chart illustrating a computational fracture mechanics life cycle counting algorithm.

Other expressions for f are possible, but the above expression is valid for flywheel energy storage systems, that is, for R greater than or equal to zero. Cycles of varying stress amplitudes are automatically taken into account by the crack growth equation. For a 4340 alloy steel with a yield strength of 195 ksi and a plane-strain fracture toughness of 80 ksi-in$^{1/2}$, fracture life curves for R=0 and R=0.80 are shown in FIG. 9. While the yield strength of the part exceeds the stress in the part where the area over which the stress acts is reduced by the size of the crack and or while the fracture toughness K remains less than the plane-strain fracture toughness of the material, the flywheel remains operational.

Thus, this invention provides a rigorous and scientifically valid process for accurately estimating the when the safe working life of the flywheel is nearing its end so that it can be retired and replaced before failure.

Obviously, numerous other modifications, combinations and variations of the preferred embodiments described above are possible and will become apparent to those skilled in the art in light of this specification. For example, many functions and advantages are described for the preferred embodiments, but in some uses of the invention, not all of these functions and advantages would be needed. Therefore, we contemplate the use of the invention using fewer than the complete set of noted functions and advantages. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein we claim:

The invention claimed is:

1. A flywheel energy storage system, comprising:
a flywheel and a bearing system supporting said flywheel for rotation about an axis inside an evacuated container;

a motor and generator coupled to said flywheel for accelerating and decelerating said flywheel for storing and retrieving energy;

a life counter for calculating and recording increments of life utilized by said flywheel energy storage system based on operational history, and for indicating when a summation of said increments of life amounts to all of a predicted life for said flywheel energy storage system so that said flywheel energy storage system may be safely taken out of service.

2. A flywheel energy storage system as defined in claim 1 wherein:

said life counter produces a signal, when said flywheel energy storage system should be taken out of service, by one or more of the following actions: triggering an alarm, displaying a reading, altering operation and stopping operation.

3. A flywheel energy storage system, comprising:

a flywheel that is supported on a bearing system for rotation about an axis inside an evacuated container and is accelerated and decelerated for storing and retrieving energy by a motor and generator;

a life counter for calculating and recording the life utilized by said flywheel energy storage system based on operational history, said life counter indicating when said flywheel energy storage system should be taken out of service based on predicted service life of system components and sub-systems as affected by said operational history.

4. A flywheel energy storage system as described in claim 3, wherein:

said life counter indicates when the said flywheel energy storage system should be taken out of service based on one or more operational parameters from a list comprising: flywheel structural life, vacuum system life, bearing system life, and electronics life.

5. A flywheel energy storage system as described in claim 4, wherein:

said flywheel rotates at high speed that generates a stress component in said flywheel that is greater than 25 ksi; and said life counter calculates and records the flywheel structural life utilized during operation of said flywheel energy storage system and indicates when said flywheel should be taken out of service.

6. A flywheel energy storage system as described in claim 5, wherein:

said life counter calculates and records the flywheel structural life utilized by counting the number of charge-discharge cycles.

7. A flywheel energy storage system as described in claim 6, wherein:

said life counter calculates and records the flywheel structural life utilized based on the low value of speed reached during discharges of said flywheel energy storage system, such that discharges to a lower speed utilize more structural life.

8. A flywheel energy storage system as described in claim 6, wherein:

said life counter indicates when said flywheel should be taken out of service based on the fatigue properties of materials of which said flywheel is made.

9. A flywheel energy storage system as described in claim 6, wherein:

said life counter indicates when said flywheel should be taken out of service based on the fracture crack growth properties of said flywheel material, along with a maximum allowable initial flaw value.

10. A flywheel energy storage system as described in claim 4, wherein:

said life counter calculates and records the life utilized by said flywheel energy storage system by recording the operating time of said flywheel system and comparing said operating time with a predicted life value.

11. A flywheel energy storage system as described in claim 10, wherein:

said flywheel is constructed from composite materials and said operating time determines said flywheel structural life utilized based on the stress rupture properties of said composite materials and the operating stress of said flywheel at the normal fully charged operating speed.

12. A flywheel energy storage system as described in claim 4, wherein:

said life counter indicates when said flywheel energy storage system should be taken out of service by one or more of the following actions from a list comprising: triggering an alarm, displaying a reading, altering operation and stopping operation.

13. A flywheel energy storage system, comprising:

a flywheel that is supported on a bearing system for rotation about an axis inside an evacuated container and is accelerated and decelerated for storing and retrieving energy by a motor and generator;

said flywheel is constructed of steel and rotates with a stress component greater than the endurance limit for said steel in normal fully charged operation;

a life counter for calculating and recording the life utilized by said flywheel energy storage system.

14. A flywheel energy storage system as described in claim 13, wherein:

said life counter calculates and records increments of structural life of said flywheel as said increments are used by counting charge-discharge cycles.

15. A flywheel energy storage system as described in claim 14, wherein:

said life counter calculates and records said increments of structural life of said flywheel based on the low value of speed reached during discharges of said flywheel energy storage system, such that discharges to a lower speed utilize more structural life than discharges only to a higher speed.

16. A flywheel energy storage system as described in claim 15, wherein:

said life counter indicates when said flywheel should be taken out of service based on fatigue properties of materials from which said flywheel is made.

17. A flywheel energy storage system as described in claim 15, wherein:

said life counter indicates when said flywheel should be taken out of service based on the fracture crack growth properties of the material of said flywheel along with a maximum allowable initial flaw value.

18. A flywheel energy storage system as described in claim 13, wherein:

said flywheel rotates in normal fully charged operation with a peripheral speed that is greater than 210 meters per second if said flywheel contains a central hole and greater than 300 meters per second if said flywheel contains no central hole.

* * * * *